US007624051B2

(12) United States Patent
Gellman

(10) Patent No.: US 7,624,051 B2
(45) Date of Patent: Nov. 24, 2009

(54) METHOD AND SYSTEM FOR FORMING A LIST-BASED VALUE DISCOVERY NETWORK

(75) Inventor: Peter Gellman, Highland Park, NJ (US)

(73) Assignee: Icon One, Inc., Highland Park, NJ (US)

( * ) Notice: Subject to any disclaimer, the term of this patent is extended or adjusted under 35 U.S.C. 154(b) by 1302 days.

(21) Appl. No.: 09/949,915

(22) Filed: Sep. 12, 2001

(65) Prior Publication Data

US 2002/0035536 A1   Mar. 21, 2002

Related U.S. Application Data

(60) Provisional application No. 60/233,629, filed on Sep. 18, 2000.

(51) Int. Cl.
*G06Q 40/00* (2006.01)
(52) U.S. Cl. ............................ 705/35; 705/37
(58) Field of Classification Search ............ 705/35, 705/37
See application file for complete search history.

(56) References Cited

U.S. PATENT DOCUMENTS

| | | | | |
|---|---|---|---|---|
| 5,890,138 | A | 3/1999 | Godin et al. .............. | 705/26 |
| 5,950,173 | A | 9/1999 | Perkowski ................ | 705/26 |
| 6,026,376 | A | 2/2000 | Kenney ................... | 705/27 |
| 6,108,639 | A * | 8/2000 | Walker et al. ............. | 705/26 |
| 6,202,051 | B1 | 3/2001 | Woolston ................. | 705/27 |
| 6,415,270 | B1 * | 7/2002 | Rackson et al. .......... | 705/36 R |
| 6,629,083 | B1 * | 9/2003 | Morton ................... | 705/37 |
| 2002/0016779 | A1 * | 2/2002 | Roll et al. ............... | 705/400 |

OTHER PUBLICATIONS

Peapod Moving On Warehouse Fulfillment Anonymous. Supermarket Business. New York: May 1998. vol. 53, Iss. 5; p. 9 (2 pages).*
Alaskans create on-line fresh fish market for processors, brokers Martin, Ingrid. Alaska Journal of Commerce. Anchorage: Oct 7, 1996. vol. 20, Iss. 41; p. 3.*

(Continued)

*Primary Examiner*—Lalita M Hamilton

(57) ABSTRACT

Embodiments of the present invention describe a network-based reverse auction system value discovery system including at least four major customers: consumers, and the three sell-side customers bidder/sellers, product manufacturers, and advertisers who are not also product manufacturers. Initially, a shopping list is constructed containing e.g., widely available goods (WAGs). The shopping list is the base of the value discovery network and ads significant value for each of the four key customers. For consumers, the value discovery system is an easy and convenient way to obtain and feel assured that they have obtained the best deal possible, consistent with their own definition of value. For bidder/sellers, the value discovery system offers a chance to sell products effectively, e.g., in a manner that maximizes profits while building consumer relationships one by one. For product manufacturers, the value discovery system offers a buying channel where marketing and trade promotion of brands, categories, and relationships can be nurtured in direct relationships with consumers and their shopping lists, unmediated by the conflicts and inefficiencies of conventional retail channels. For other advertisers, the data-rich value discovery facilitates communication with those who make important household spending decisions, enabling crafted, precise, messages to be delivered to the right audience.

46 Claims, 2 Drawing Sheets

OTHER PUBLICATIONS

Orb | Bid Live Auctions and Auction Tools Web Site, www.orbbid.com, Copyright 2000.
Orb | Bid Product Sheet, www.orbbid.com/orbbid1.html. Copyright 1998.
Orb | Bid Discussion of Auction Formats, www.orbbid.com/format.html, undated.
Orb | Bid Statement, www.orbbid.com/orbbid_statement.html. Copyright 2000.
Orb | Bid Rationale, www.orbbid.com/Rationale/rational.html. Copyright 2001.
Orb | Bid Concept, www.orbbid.com/concept.html, undated.
Orb | Bid Targets, www.orbbid.com/buysell.html, undated.

* cited by examiner

US 7,624,051 B2

METHOD AND SYSTEM FOR FORMING A LIST-BASED VALUE DISCOVERY NETWORK

PRIORITY APPLICATION

This application claims the benefit of U.S. Provisional Application No. 60/233,629, filed Sep. 18, 2000, titled "Method and System for Forming a List-Based Value Discovery Network," which is incorporated herein by reference.

BACKGROUND OF THE INVENTION

1. Field of the Invention

The invention is drawn generally to methods and systems for discovering the value of list-based goods, and more particularly to reverse auction network methods and systems.

2. Description of the Related Art

There are many firms participating in on-line retailing of groceries, and that number will grow in the next few years. Current net-based grocery services include Peapod/Ahold, Groceryworks/Safeway, eGrocer, Priceline Webhouse. Peapod/Ahold and Groceryworks/Safeway mainly coordinate the delivery of groceries for consumers. The eGrocer service advertises end-to-end online business solutions for the grocery industry, including among other things software solutions, database management solutions, and web-hosting solutions. This service is available to individual grocery stores, who wish to offer their consumers on-line grocery shopping. This is not a value discovery tool. Priceline Webhouse, now discontinued, used "name your price" for groceries. Priceline's model was anti-discovery in that the consumer cannot solicit and compare bids; he/she must guess about best price and is committed if that offer is accepted. Priceline defined value as price, forcing the consumer to set aside issues like convenience, time, and future benefits. Focus on price also destroys brand equity, because consumers are encouraged to bid down the branded item. This is a coupon offer that undercuts the coupon's traditional narrow role of building ties between brand and the price-sensitive consumer.

Thus, there is a need in the art for a value-discovery network that revolutionizes and accelerates the market.

SUMMARY OF THE INVENTION

Embodiments of the present invention speed up the disappearance of the economic lines between distributor and retailer and between categories of retail using a network that enables consumers to instantly navigate new ranges of choices for obtaining items on their shopping lists.

Embodiments of the present invention include a value discovery system including at least four major customers: shoppers or consumers (referred heretofore as "consumers"), and the three sell-side customers bidder/sellers, product manufacturers, and advertisers who are not also product manufacturers. Initially, a shopping list is constructed containing e.g., widely available goods (WAGs). The shopping list is the base of the value discovery network and ads significant value for each of the four key customers. For consumers, the value discovery system is an easy and convenient way to obtain and feel assured that they have obtained the best deal possible, consistent with their own definition of value. For bidder/sellers, the value discovery system offers a chance to sell products effectively, e.g., in a manner that maximizes profits while building customer relationships one by one. For product manufacturers, the value discovery system offers a buying channel where marketing and trade promotion of brands, categories, and relationships can be nurtured in direct relationships with customers and their shopping lists, unmediated by the conflicts and inefficiencies of conventional retail channels. For other advertisers, the data-rich value discovery facilitates communication with those who make important household spending decisions, enabling crafted, precise, messages to be delivered to the right audience.

In preferred embodiments of the present invention, the value discovery system's flexibility allows each segment of consumers to pursue its version of value. The price sensitive, coupon consumer and the consumer that craves their gourmet spaghetti sauces and coffee beans, both communicate those needs and receive customized responses from bidder/sellers, product manufacturers, and advertisers.

A feature of the preferred embodiments is that the consumer gains the clarity of seeing what his list of items is really worth when he/she solicits bids, compares them, and ranks them according to his/her preferences. Knowing what a list of twenty or more items is worth is a time-consuming, counter-productive task in the physical world. Online, using the value discovery system of the current invention, the consumer finds out immediately. Using the value discovery system, the consumer also permits a group of bidder/sellers to compete for his/her business by making highly personal offers to the consumer that take account of the consumer's tastes and preferences. The consumer reaps both economic and psychological rewards by managing the market to serve his/her goal of maximizing value. And while the consumer's definition of value is paramount, auctions for WAGs, such as those found on a shopping list, increase the number of sellers, push prices lower, and challenge sellers to seek profitability through enhanced value propositions.

A further feature of the present invention is that the consumer also enjoys the convenience of a permanent repository of his/her list or portfolio of lists (e.g., the weekly run, a monthly big purchase, a list for parties, recipes etc.) that makes the task of planning and submitting a shopping list extremely easy. The consumer has an increasing network of fellow consumers who provide communal benefits (e.g., sharing or posting a list, evaluating bidder/sellers, strategizing to maximize value received). The consumer has product manufacturers personalizing their promotional pitches to him/her. Further, the consumer may peruse virtual aisles containing an extensive universe of products and product information.

In embodiments of the present invention, bidder/sellers gain access to a steady flow of motivated consumers eager to buy. Bidder/sellers use the progressively richer profiles of the consumers to deliver the greatest value to their most valuable customers. The value discovery system enables up-selling which is the process of moving the consumer in the direction of more profitable buying decisions. Over time, the cumulative experience of individualized offers yields to the bidder/seller a rich reservoir of data for both strategic and marketing purposes.

The value discovery system of the present invention also offers retailers a variety of opportunities to increase profitability. For example, store brand and private label WAGs offer superior profit margins. Bidder/sellers can use, e.g., couponing, sampling, rewards, and a consumer's own willingness to accept private label substitution to increase the store brand component of the auction list. The value discovery system provides an online channel through which retailers can aggressively market selected types of goods. Further, the value discovery system also provides a supercharged, personalized, data-rich environment for loyalty or relationship-based programs. This allows bidder/sellers to execute more ambitious consumer acquisition and retention strategies. For example, in embodiments of the present invention, bidder/ sellers offer discounts for consumers who choose fulfillment on slow days to smooth out traffic, and offer cash-back programs in return for a consumer's commitment to tender multiple lists during a given cycle.

According to preferred embodiments of the present invention, the data-rich venue resulting from the value discovery system empowers product manufacturers to execute mass customization, one-to-one product promotion strategies. The value discovery system of the present invention, builds consumer profiles continuously and without interruption, due to the fact that a consumer's switch from one bidder/seller to another occurs within the value discovery network. As a result, a product manufacturer has opportunities to deepen its brand relationships with the consumer as well as to refine its alliance and marketing strategies with retailers and other bidder/sellers.

It is a feature of the present invention, that consumers define themselves through their creation of lists. Within the boundaries of pre-established privacy rules, the value discovery system of the present invention allows marketers to respond directly to that self-definition. The granular, itemized character of a shopping list gives brand management an opportunity to deploy marketing tools and resources with focus and strong effect. For example, consumers whose shopping histories show strong price sensitivity are offered coupons. Similarly, consumers who focus on variety and quality or those looking for the quickest way to prepare meals are pitched with targeted messages and offers.

It is a further feature of the present invention that product placement within the virtual aisles is reconfigurable with every consumer. More particularly, shelf space configuration within the virtual aisle and category growth can be pursued directly; one consumer and one page view at a time. Where collaboration with retailers in the physical world imposes frictions and tradeoffs, on-line category management is unmediated and uncluttered.

Described below, there is a shopping list based value discovery network formed via a consumer to business auction process that realizes the revolutionary potential for buying on the Internet. Like a PC operating system, a networked, smart, shopping list (e.g., grocery list) is a platform for hosting a wide array of useful, time-saving activities for consumers and revenue-generating activities for sellers, manufacturers, and advertisers.

In an embodiment of the invention, a shopping list and the selections indicated thereon, are visible to all consumers, giving bidder/sellers, product manufacturers, and advertisers an effective way to market to consumers.

In an embodiment of the present invention shopping list-based value discovery is accomplished through a reverse auction or tender process. In this preferred embodiment, a consumer creates a list of desired items, and bidder/sellers compete to provide the best combination of price, selection, and convenience by bidding on the list. Utilizing the consumer created list information, product manufacturers or service providers can use the shopping list platform to market their particular products or services.

DESCRIPTION OF THE PREFERRED EMBODIMENTS

Figure 1:
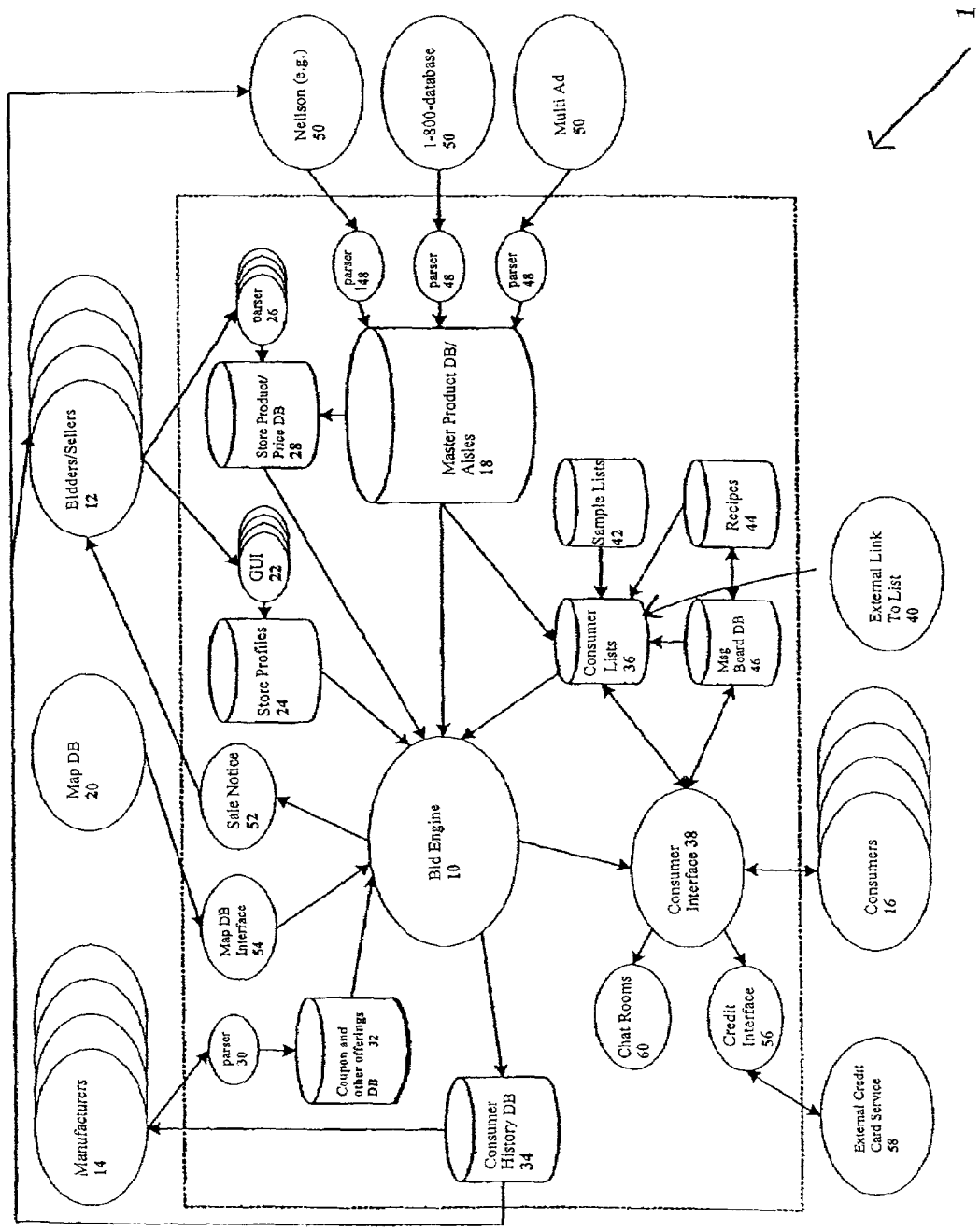
FIG. 1 is a system for practicing the methods of the invention according to an embodiment of the present invention.

In an embodiment of the present invention, shopping list-based value discovery is accomplished through a reverse auction, or tender system and process. The reverse auction process is facilitated on a network platform, such as the Internet, through specially designed software and hardware (e.g., server) configurations. Each of the parties to the auction are able to login to the reverse auction system via appropriate hardware, e.g., personal computers (PCs), wireless or non-wireless personal digital assistants (PDAs), cellular phone, network appliances and any other appropriate merchant or customer terminals. Further, certain embodiments of the present invention are voice enabled, and run on a voice activated application. The state of the art is such that one skilled in the art is able to design appropriate software and hardware configurations to facilitate the processes described herein without undue experimentation. FIG. 1 is an exemplary system schematic 1 for implementing the processes described herein. The system 1 includes a bid engine 10 which receives/retrieves information from at least, bidder/sellers 12, manufacturers 14, and consumers 16. Further, the bid engine 10 can receive/retrieve information from a master product database 18 and a mapping database (e.g., MapQuest) 20.

Store profile information from the bidders/sellers 12 can be entered by bidders/sellers through, for example, a graphical user interface 22 into a store profile database 24. The store profile database 24 is then accessed by the bid engine 10. Bidder/sellers' store product and price information may also be entered via a parser 26 into a store product and pricing database 28. Programs for parsing are well known to those skilled in the art. The store product and pricing database 28 is then accessed by the bid engine 10.

Manufacturers' information can be entered by manufacturers 14 via a parser 30 into, for example, a coupon and other offerings database 32 including coupon, incentive, and other offerings information, which is accessed by the bid engine 10. As discussed below, the manufacturers 14 retrieve information about consumer shopping preferences from the bid engine 10 through a consumer history database 34 and from this information, the manufacturers have the ability to formulate incentive coupon offerings.

Consumers 16 provide information to the bid engine 10 in the form of consumer lists stored in, for example, a consumer list database 36. The consumers 16 provide information to the consumer list database 36 through both on-line 38 and external 40 links. The on-line link 38 may be, for example, a consumer interface, which is also used to access external credit card services 58, through credit interface 56 and chat rooms 60. The consumer list database 36 is also fed information through a sample list database 42, a recipe database 44, and a message board database 46.

Finally, the bid engine 10 can receive/retrieve information from a master product database 18 which is fed information via parsers 48 from multiple product information sources 50, such as, Neilson, 1-800-database, and Multi Ad and from a mapping database 20, through a mapping database interface 54.

As discussed with reference to the manufacturers' information, the bid engine 10 also transmits information to, for example, the consumer history database 34, the on-line consumer interface 38, and the bidder/sellers 12 through sale notices 52 forming a feedback-type loop system for sharing information. The consumer history database 34 is also accessed by the bidder/sellers 12 and the multiple product information sources 50 as well as consumers themselves.

Using the information from the consumer history database 34, when prompted by the consumer, the value discovery system offers consumers the ability to see the consumer's list and individual item histories. In a further embodiment, the value discovery system includes applications for organizing and analyzing history information into timelines, graphs, etc., in order to reflect a consumer's buying habits.

As discussed above, the value discovery system is a network. In preferred embodiments of the present invention, the network takes core value propositions provided to the four principal customers, i.e., consumers, bidder/sellers, product manufacturers, and advertisers and infuses them with exponential, positive feedback qualities. Metcalfe's law posits that the value of a network is the square of its number of members. In accordance with an embodiment of the present invention, every new participant in a value discovery system makes the network experience more valuable for all existing participants. The next customer, choosing between the largest network with the greatest membership and a smaller one with few users, almost always concludes that a larger network is better. Once the identity of the leading network becomes clear, the expansion of the network occurs even faster, and the knowledge base expands accordingly.

More consumers mean more resources and experiences that consumers can share with each other for their mutual benefit. More consumers also mean more bidder/sellers, product manufacturers, and advertisers entering or increasing their activities within the network because the market is now more valuable. Greater choice and more efforts by the three sell-side customers to create value for the consumer in turn attracts even more consumers who in turn spend more of their time and resources on the value discovery network, and so on. The buy side and the sell side fuel each other's growth.

Figure 2:
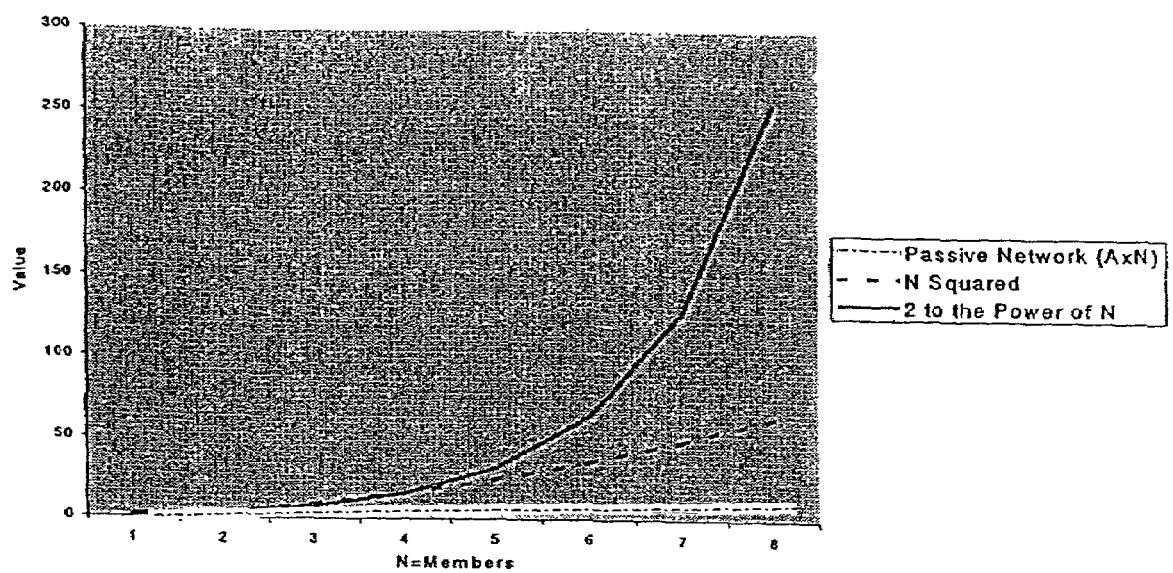
FIG. 2 is a graph of network values versus number of members according to an embodiment of the present invention.

Networks that empower community by enabling affiliations and associations among subsets of two or more of a network's members, also referred to as group forming networks (GFNs) create values of $2^n$. As FIG. 2 illustrates, $2^n$ is radically more valuable than a one (content distributed)-to-many passive network (e.g. a television network), or even Metcalfe's Law square of n valuation.

The value discovery system according to the present invention benefits from "network effects" such as the potential for GFNs. For example, a market based on WAGs in the form of, e.g., groceries, is a market that is large (approximately $460 billion annually at the time of filing this application), and is habitual or as it is often referred to in the market, sticky (2.1 shopping trips per family per week). It is also a market where bidder/sellers, advertisers, and product manufacturers are focused on building long-term affiliations with consumers, and where they already allocate large amounts of capital to acquire and maintain these relationships.

For advertising and product promotion, network growth also means that data capture and data-informed marketing are progressively more valuable. The value discovery system's effective compilation and analysis of usage patterns and trends assists advertisers and marketers in optimizing the focus of their respective advertising and marketing efforts.

In a first preferred embodiment, a consumer creates a list of desired items, and bidder/sellers can compete to provide the best combination of price, selection, and convenience by bidding on the list. The consumer may use any available means for creating the list of desired items. For example, the consumer can manually enter product names or manufacturer names into a search window provided on a webpage of the value discovery website and the value discovery server will provide a list of compiled products from which the consumer may select a particular product. Further, using optical scanning technology (e.g., CueCat from CRQ), the consumer can scan standard product codes (e.g., universal product code (UPC), International Standard Book Number (ISBN), Stock Keeping Unit (SKU)) provided on items and automatically add the corresponding product to his/her list. For example, if the consumer wishes to add shampoo to his/her list, the consumer retrieves the bottle and scans the standard product code with an optical reader/scanner to transmit the standard product code and consequently the product name, type, etc. to the list on the value discovery website. The consumer can also scan bar codes provided in magazines or newspapers in order to automatically add items to his/her shopping list.

In this first preferred embodiment, consumers are able to specify fulfillment preferences, including, brand preferences and/or the acceptability of substitutes, whether the consumer wishes to have the goods on the list pre-packaged for pick-up from the bidder/seller or delivered to the consumer, the radius within which the consumer is willing to travel to pick-up the goods on the list, store preferences, etc. In an embodiment of the present invention, the system's decision rules are designed to have a default brand or code for each product, such that when a consumer selects a product without specifying a brand name, this default brand is automatically selected by the system prior to submitting the list for auction. For example, if a consumer selects sugar as an item, the system may default to e.g., Domino's or alternatively, the system indicates that a generic brand is acceptable, in which case, most larger supermarkets offer their own label, e.g., Safeway, Giant, Kroger, etc. The system aids the consumer in creating the list in other ways as well. For example, the system is able to track previous lists made by individual consumers and make these lists available for automatic call-up by the individual consumer. The system also allows an individual consumer to keep multiple lists. Further, in an embodiment of the present invention, the system provides pre-formed sample lists that consumers can either use "as is" or amend to suit the consumer's particular needs. The sources for these pre-formed lists are unlimited. For example, other consumers may choose to share their specialty lists, such as, lists for diabetics, children, individuals with high cholesterol, special weight-loss diets, or individuals keeping kosher. Further, specialty lists may be provided by the other consumers of the system.

In a particular embodiment, an individual consumer shops every week for essentially the same items, such that every week at a selected time, the "Weekly Shopping List" becomes available for the consumer's review prior to ordering. In this embodiment, the consumer requests that the system commence with submitting the "Weekly Shopping List" to auction automatically and order from the lowest bidder automatically. Alternatively, the consumer elects to review the list and possibly make revisions prior to placing the order. A specific example is the case where a consumer establishes a "weekly shopping list" that includes milk, eggs, and bread to be packaged and delivered to his home on Friday afternoons after 4:00 PM. The consumer programs the system to submit this list for auction on Friday mornings, accept the lowest bid on the list, and charge the consumer's credit card for the amount. Alternatively, the consumer programs the system to automatically submit the list for auction, but not to automatically purchase from the lowest bidder. Instead, the consumer may request that an e-mail or page, for example, be sent to alert the consumer that the bidding is complete, so that the consumer may consider the bids and make the final determination as to which bid he chooses to accept. This type of scenario takes into account the idiosyncrasies of consumers. The lowest monetary bid is not necessarily the best overall bid for an idiosyncratic consumer. For example, the lowest bid could include only generic items or it may require that the goods be picked-up rather than delivered. The system described herein allows the consumer to view multiple bids with multiple combinations of preferences. The consumer can enter as few or as many preferences as they wish, prior to submitting the list for auction. Finally, the consumer may wish to review the list prior to submission to auction. In order for a consumer to remove and/or add items from and/or to the list, there are multiple configurations of the system's user interface that are used to achieve these functions. For example, on a Webpage, PDA screen, or the like in a preferred embodiment of the present invention, next to each item, there is a box which when checked indicates either (a) do not include this item in the list submitted to auction or (b) include this item in the list submitted to auction. Whether the configuration is (a) or (b) is a matter of designer preference. After the list is reviewed by the consumer and the appropriate boxes are selected, then the consumer submits the list to auction.

In an alternate embodiment, instead of or in addition to weekly, bi-weekly, monthly, etc. shopping lists, a second type of list may be a specialty list, such as "Holiday Shopping List" or "Barbecue Shopping List." These lists contain items that the consumer usually buys in preparation for a special event. The present invention will store these lists for call-up by the consumer and then, depending on the commands of the consumer, may perform any of a number of programs on the specialty list. For example, the system could submit the list "as is" for auction or the system could compare the list with the "Weekly Shopping List" to determine if there are overlapping items.

In addition to storing the various lists of an individual consumer, to allow for review and comparison in order to compile the most complete list for the consumers needs, the system also aids the consumer in forming his/her list by offering easy access to product information and/or pre-formed list information (e.g., recipes). For example, a website established for forming the consumer's lists, includes links to particular product or recipe sites. Multiple search engines may be provided to aid the consumer in making selections for his/her lists. For example, a search blank may be provided on the webpage wherein a consumer can enter, for example, the word "beef" and be presented with multiple types of beef products, e.g., ground beef, rib-eyes, tenderloins, flank steak, etc. with descriptions of each to aid the consumer in selecting an appropriate cut of beef. Additionally, the consumer may be provided with a selection of brand names associated with a particular type of product and/or recipes that utilize the selected product. One skilled in the art recognizes the many variations in search parameters that are useful for locating product information.

In a further embodiment of the present invention, a visual configuration of goods referred to as a virtual aisle is implemented as a navigational tool. Resembling, in the grocery store context, an aisle in a store, the system of the present invention provides the consumer with a virtual aisle of types of goods. In an embodiment of the present invention, the virtual aisle is a navigable presentation of hypertext, icons and images, representing types of goods. One skilled in the art recognizes the multiple, technologically varied virtual aisle configurations that are within the scope of the invention. The consumer selects a particular brand or type of good to add to his/her list. For example, a consumer has a recipe that calls for a spicy olive. Using the virtual aisle navigational tool, the consumer types in "olives" or "spicy olives" into a search window provided on the webpage and a shelf is called up that includes all olive products and depending on design choice, other olive-related products (e.g., salty snacks, martini mix).

In an embodiment of the present invention, it is possible for the consumer to access further information (e.g., dietary and nutritional information, ingredients or other information offered by the product manufacturer) about a product in order to aid the consumer in forming his/her list. This information may be provided through various links (to e.g., the Uniform Code Council ("UCC"), AC Nielson, 1-800-database, Multi-Ad, Informational Resources Inc. ("IRI")) provided in conjunction with the product listing. Consequently, the consumer is provided with a plethora of information about, for example, spicy olives, from which the consumer is able to make an informed decision about which spicy olive is right for the consumer's needs. It is not necessary to explain the numerous informational linking capabilities of a network-based (e.g. Internet) value discovery system, as one skilled in the art recognizes the many variations that are within the scope of the disclosed invention.

In addition to the list-forming functions discussed above, the present invention also offers an icon, indicative of the value discovery website, which aids a consumer in recognizing products which may be added to his/her shopping list and gives the consumer an easy way to add the product to his/her list without having to enter the value discovery website, call-up the list, and enter the product name.

Referred to as the "buy-side icon," consumers who use the value discovery system of the present invention, may download, or otherwise install, an icon software application, wherein an icon is displayed on the graphical user interface of the consumer's network interface. Selecting this icon enables the consumer to access and tender his/her list(s) from whatever device they choose and from wherever they may be using the device. Consequently, as technology extends Internet access beyond the desktop, the buy-side icon enables consumers to manage their lists using, for example, cellular phones and other wireless devices, kitchen-based network appliances like the I-OPENER or touch screens on refrigerators, interactive television and car-based network access. According to embodiments of the present invention, the value discovery system is available wherever consumers find it convenient to do their shopping.

Similarly, referred to as the "sell-side icon," bidder/sellers, product manufacturers, and advertisers are provided with icon enabling software for use with the value discovery system of the present invention. The sell-side icon permits consumers to interact with an ad or promotional offer and place the featured products on their lists for future disposition. The icon turns an array of passive media into effective direct marketing. The sell-side icon makes every product SKU a potential revenue stream, and the use of the icon a standard line item on every marketing and advertising budget.

In an alternate embodiment, the "sell-side icon" is not strictly software-based, but rather is found throughout any and all types of advertising mediums as well as on the items themselves. An icon located on a non-network linked medium has an item barcode or other identifying code located thereon or in close proximity thereto and this barcode or identifying code can be scanned (e.g., optically) or the alphanumeric characters can be entered manually by the consumer into the network. The network interfaces are equipped with keyboards or alphanumeric keypads for entering such identifying codes manually. Consequently, the icon indicates to a consumer that the manufacturer, advertiser, or buyer/seller of an item is affiliated with the value discovery system and the identifying codes embedded therein allow the consumer to easily add the item to the consumer's list.

According to representative embodiments of the present invention, the consumer can simply select the icon, in the case of a product offered on a website (e.g., through a web-banner or on a website other than the value discovery website) and the icon links to the value discovery website and adds the product to the consumer's list(s). If the consumer has multiple lists, the value discovery website prompts the consumer to select to which list the consumer desires to add the product. Alternatively, the rules of the value discovery website may automatically put the product into the "Weekly Shopping List." A consumer may also find the icon on the pages of a magazine or in a newspaper advertisement. Next to the icon and the product is a bar code. Using a bar code scanner (e.g., attached to a PDA), the consumer is able to add the product to his/her auction list by scanning the bar code. Further, using interactive TV, the icon may appear on television advertisements for various products. Using an interactive remote, the consumer may add the product on the screen to his/her shopping list(s).

A particular system example for allowing a consumer to use interactive TV and icon-linking technology to add products to the consumers list includes at least an interactive TV receiver, multiple servers, a modem, and an interactive remote for the main components. Referring to, for example, U.S. Pat. No. 6,075,527, incorporated herein by reference in its entirety, one skilled in the art recognizes the multiple components that may be utilized to establish an interactive television system. In an embodiment wherein the manufacturer of a product provides the icon through the interactive TV system, the manufacturer, for example, can include the icon as one of multiple data streams in a composite data stream (e.g., embedded data stream) that is broadcast as part of an advertisement. U.S. Pat. No. 6,097,441 offers a detailed description of the data stream technology and is incorporated herein by reference in its entirety. The consumer's interactive TV receiver is capable of receiving and separating complex data streams that include, for example, text, audio, video, and Internet data streams. Consequently, the projected image on the TV screen includes the advertisement, in addition to the icon, located in, for example, the corner of the TV screen. Using the interactive remote, the consumer may select the icon. Further, by selecting this icon, the system is designed to dial-up a modem connection over a designated telephone line or over a pre-established digital subscriber line (DSL) or access an "always on" broadband link and connect to multiple potential servers, including, the value discovery website server, the broadcasting server, and ultimately, the manufacturer's server in order to identify the consumer's selection of the icon. Further, the interactive TV receiver tags the transmitted information with an identifier that is unique to the consumer, so that the value discovery website server is capable of adding the selected product to the consumer's individual list. This is but one example of how the icon-linking process may occur. One skilled in the art recognizes the many possible variations in both system construction and methodology.

According to preferred embodiments of the present invention, once a consumer submits a list of goods, including any and all preferences, e.g., distance, fulfillment method, etc., all registered bidder/sellers qualifying under the consumer's designated preferences are able to bid on the list. When the list is submitted to the value discovery auction engine, the registered bidder/sellers respond to that list through bidder-seller specific, pre-defined bidding rules that the individual bidder/sellers have placed with the value discovery auction engine. Using these pre-defined bidding rules and the auction decision rules, the value discovery auction engine generates a number of bids for the consumer to compare. The bidder/sellers are free to change their pre-defined bidding rules at any point, and are constrained only by the requirements set forth through the auction decision rules. The value discovery system of the present invention is open to any and all types of bidder/sellers. Any firm that qualifies under the consumer's preferences and that is capable of providing the list of goods or a list comparable thereto, can bid on the list. For example, in the case of supermarket type goods, possible bidder/sellers include independent firms having only one location (e.g., neighborhood bodega) to nationwide grocery store chains (e.g., Safeway, Trader Joe's, Albertsons) to non-traditional firms, such as, CVS, Wal-Mart, K-Mart, Target, Price Club, Costco, and even gas-stations (e.g., Exxon's TigerMart) which are currently entering the grocery market on smaller scales. For example, where supermarkets sell health and beauty or general merchandise in addition to food items, modernized drugstores sell fresh milk and bread, gas station-based convenience stores sell home meal replacement items, and chains like Target and K-Mart sell a wide variety of non-perishables. Further, all of these entities deal with wholesalers who are themselves potential bidder/sellers. Wholesalers already have the capability to deliver pre-packed bins of non-perishable, refrigerated and frozen goods. Utilizing the system and method of the present invention, these bins are immediately ready for consumer pickup or home delivery, a distinct improvement in fulfillment over the traditional consumer labor required by traditional supermarkets. As a point of reference, approximately 7500 SKUs make up 80 percent of consumers' grocery-type purchases, making implementation of these new partnerships feasible.

In addition to the bidder/sellers who actively participate in the value discovery system and process of the present invention, in a further embodiment of the present invention, the value discovery system includes intelligent agents for performing searches of non-participating on-line stores and formulate bids for consumer's lists from these stores. The intelligent agents use robots or "bots" to go out and gather information from other sites. If a non-participating vendor is online and can potentially service a consumer's list, the intelligent agents, through the bots, can go out and scan the site of the non-participating potential bidder/seller and formulate a bid so that the consumer can see what that list is going to cost at non-participating as well as participating vendors.

In this case, the non-participating store will not be able to offer a value proposition customized to that consumer, because they are not actually participating in the system, but the bid price provided by the intelligent agents will offer bids for comparison with those from participating stores, thus allowing the consumers to accurately value the list that they have formulated. While these bids could possibly be the best from the perspective of an individual consumer, in all likelihood, bids formulated by the intelligent agents, based on non-participating firms, will be the least desirable due to the fact that there will be no individualized incentives offered to entice the consumers. Consequently, beyond just being an informational service, the bids gathered by the intelligent agents, when compared with the bids offered by the participating firms, tend to make the bids of the participating firms more attractive and simultaneously assure the consumers that they are getting the best deal for their proffered list(s).

In an embodiment of the present invention, in addition to meeting all or at least some of the requirements set forth in a consumer's list(s), the bidder/sellers offer additional incentives to the consumer in order to make their individual bids more attractive to an individual consumer. While some incentives are blanket incentives that are offered across the board with each bid (e.g., buy one 4-pack of Charmin Ultra, get a second for ½ price) other incentives are individualized to the consumer based on information gleaned from the consumer's current list, and or the consumer's list history. For example, a bidder/seller tracks the purchasing preferences of a particular consumer and offers free products or reduced-price products based on these preferences to this particular consumer. A specific example is a consumer who repeatedly purchases different types of cookies. As an incentive to convince that consumer to accept its bid on the consumer's current or even future list(s), bidder/seller X offers 2 free boxes of cookies with acceptance of bidder/seller X's bid. The number and types of incentives are limited only by the resources of the bidder/seller, but examples include coupons, free goods, cash-back and loyalty or other reward-type programs (e.g., 1,000 air mile points on this purchase). The bidder/sellers may also make their individual bids more attractive by offering helpful service-type suggestions along with their bids. For example, a consumer may submit a list of 20 goods, citing specific brand preferences for 5 of the goods. Bidder/seller X provides a bid for the 20 goods including the 5 brand preferences, but alternatively, provides an alternate bid should the consumer decide that the 5 brand preferences are not a requirement (e.g., an alternative brand is on sale or a generic brand is cheaper). Further as an incentive service, bidder/seller X may offer related goods suggestions based on the preferences of the individual consumer.

Using message boards and chat rooms, the system of the present invention offers consumers an easy way to communicate the consumer's likes and dislikes about the products, including the manufacturers of the products, the bidder/sellers, and the system itself. This type of information is invaluable in aiding a consumer with the selection of items to add to his/her list as well as to deciding between bids from different bidder/sellers. In an embodiment of the present invention, the message boards for posting consumer evaluations are constructed so as to only be accessible to those who have actually made a purchase from a particular bidder/seller or manufacturer. For example, when a consumer wishes to put a message about a particular bidder/seller or manufacturer on a message board, the message board requires the consumer to select the particular bidder/seller or manufacturer from, for example, a drop-down menu and to enter a system issued identification ("ID") (e.g., a password). Using the ID, the system can pull up the transactions corresponding to the ID and compare the transaction data (e.g., bidder/sellers and/or manufacturers previously used) with the selected bidder/seller or manufacturer. Assuming there is a match, the system allows the consumer to post a message about this particular bidder/seller or manufacturer and stores the message under a heading that is the name of the bidder/seller or manufacturer, so that potential consumers can access the comments for any bidder/seller or manufacturer via this heading.

In a specific, exemplary implementation of the previously described embodiments, Consumer X is a registered consumer with a value discovery system according to the above-identified embodiments. Consumer X usually transacts using the touch screen "netpliance" mounted on his/her kitchen counter. On this particular day, however, an early meeting precludes Consumer X from submitting his/her list before leaving for work, so Consumer X uses his/her web-enabled Palm Pilot instead. Consumer X clicks on the auction icon on his/her Palm Pilot and then on his/her stored "Weekly Shopping List." The list contains twenty-five items. Two days earlier, Consumer X saw a newspaper ad with a manufacturer's offer for a fifty per cent discount on a new kind of premium ice cream. The ad included the auction icon link, so Consumer X used his/her Palm Pilot's barcode reader at that time to add the item to his/her list. Consumer X clicks the "check them all except" button on the auction interface screen and then specifies which items on the list he/she does not want this week.

Normally Consumer X would submit his/her list at this point. As it happens, Consumer X is planning a dinner party for this week, so he/she goes to the recipe section and types "dinner Thai noodles Italian veal" in the search window. After reviewing the resulting recipes, the consumer saves two and clicks the ingredients from the recipes onto his/her list. Once again he/she hits the "check them all except" and checks product Y as something he/she already has and doesn't need.

Consumer X specifies a brand or brands for each item, and indicates those items (if any) for which she will accept substitutions (e.g. private label). Consumer X also specifies his/her fulfillment preferences. Consumer X chooses to hear from bidder/sellers who can provide home delivery, those who provide nearby drive-through or walk-in pickup of a pre-packed order, and from those stores within a 1.5 mile radius of his/her home where Consumer X will pick the items off the shelves himself/herself.

Bidder/Sellers respond automatically to Consumer X's list using the system of the current invention, including the system's pre-defined bidding rules. While the bidder/sellers don't know who Consumer X is, they know Consumer X's profile based on Consumer X's thirty-five previous uses of the list. This data enables the bidder/sellers to construct an offer that is both appealing to Consumer X and profitable to them.

By way of example, bidder/seller #1 offers home delivery of the list for $85. Bidder/Seller #2 offers the list for $81 to be picked up at a convenience store located at a gas station 1 mile from his/her home. Bidder/Seller #2 also offers a buy one, get one free coupon for a car wash at the gas station. Bidder/Seller #3 offers to fulfill the list for $74 and offers a $5 discount plus 1000 bonus loyalty card points and 1000 free miles for her existing Delta Airlines account the next time Consumer X chooses #3 for a transaction that is greater than $60. Bidder/Seller #4 takes full advantage of Consumer X's willingness to accept private label substitution and bids $68. Consumer X's historical shopping profile shows a partiality to salty snack foods, so bidder/seller #4 also offers to throw in three free bags of its private label gourmet tortilla chips. Bidder/Sellers #3 and #4 require Consumer X to pick the items himself/herself at their stores. Finally, the system's retrieval technology (e.g., via intelligent agents) retrieves prices for Consumer X's list from Acme, a non-participating online vendor with a store one mile from Consumer X's house. Due to the lack of information, Acme's bid is higher, $98.

Consumer X compares the competing offers, selecting the one (if any) that delivers the best value (price, convenience, future benefits etc.) to him/her, based on his/her definition of value. Consumer X checks the community message boards to see others' experience with these particular Bidder/Sellers. Consumer X chooses and either pays online with e.g., a credit or debit card or off-line (e.g., at the time Consumer X picks up the order, when the order is delivered).

The particular embodiment described above is but one example resulting from the system and process of the present invention. This example is not meant to be limiting in any way and one skilled in the art recognizes the many possible variations that fall within the scope of this invention.

Although many of the examples described above refer to lists comprised of household consumables (e.g., groceries) as the example of WAGs which are easily put into list form and offered for bids in the reverse auction process of the present invention, there are any number of other categories of WAGs which may be the subject of the reverse auction process. For example, other markets for WAGs include, health and beauty, office products, and home improvement/hardware. In certain embodiments of the present invention, the shopping lists entered for reverse auction may in fact include products from any or all categories of products. Further, given the global accessibility and use of the Internet, embodiments of the present invention assume consumers, buyers/sellers, manufacturers, and advertisers from around the world.

In an alternative embodiment, the current invention also includes a reverse auction system for use with products not normally considered to be WAGs, such as cars, electronics equipment, and services. Service products include, for example, telecommunications services (e.g., long-distance service, Internet service, wireless phone service, cable service).

The embodiments described above are not intended to be limiting. One skilled in the art can appreciate the myriad of embodiment variations that fall within the scope of the invention as set forth.

I claim:

1. A method performed by a bid engine computer system, the method comprising
    presenting, to a consumer, by the bid engine computer system, types of goods available for sale including at least one of milk, bread, eggs, beef and olives,
    receiving, from the consumer, by the bid engine computer system, selections from among said types of goods,
    causing, by the bid engine computer system, a list comprising the consumer's selections to be presented to the consumer,
    automatically formulating, by the bid engine computer system, at least two bids for the list of items in response to the list being submitted to the bid engine computer system for auction by said consumer, each of said bids including terms under which the bidder is willing to sell the list of items to the consumer, at least one of the terms of each bid a) being different from any term in each other bid, b) being other than the price of the list of items, and c) being other than a delivery term,
    presenting, by the bid engine computer system, the bids concurrently to the consumer, and
    receiving, by the bid engine computer system, an indication from the consumer as to which of the concurrently presented bids the consumer wishes to accept.

2. The invention of claim 1 wherein said list comprising the consumer's selections includes at least one product brand preferred by the consumer for a particular type of goods and wherein at least one of said at least two bids includes a product brand for said particular type of goods that is other than said product brand preferred by the consumer.

3. The invention of claim 1 wherein another one of said terms of said formulated bids is delivery time.

4. The invention of claim 1 wherein one of the terms of one of said at least two bids is a location to which the consumer must go to pick up the items and one of the terms of another one of said at least two bids is that the items will be delivered.

5. The invention of claim 1 wherein at least one of the terms of a particular one of the bids is a particular incentive and wherein the terms of at least one of the other bids does not include that particular incentive.

6. The invention of claim 5 wherein said incentive is a one of: a coupon, a free item, loyalty points and cash.

7. The invention of claim 1 wherein said formulating is performed as a function of at least one fulfillment preference specified by the consumer that relates to other than item price and to other than delivery.

8. The invention of claim 7 wherein said at least one fulfillment preference is a product brand.

9. The invention of claim 7 wherein said at least one fulfillment preference is delivery time.

10. The invention of claim 7 wherein said at least one fulfillment preference is a store preference.

11. The invention of claim 7 wherein said at least one fulfillment preference is that the items are to be delivered to a location specified by the consumer.

12. The invention of claim 7 wherein said at least one fulfillment preference is the identity of at least one of a) the bidder, and b) a retail establishment from which at least ones of the items are to be provided.

13. The invention of claim 7 wherein said at least one fulfillment preference is a distance from a specified location that said consumer is willing to travel to pick up the items.

14. The invention of claim 7 wherein said at least one fulfillment preference is that the consumer wishes to have the items on the list pre-packaged for pick-up by the consumer.

15. The invention of claim 7 wherein said formulating is performed as a further function of at least one criterion specified by the consumer other than a criterion relating to item price.

16. The invention of claim 15 wherein said criterion is a willingness on the part of the consumer to waive at least one fulfillment preference.

17. The invention of claim 16 wherein said criterion is the willingness to waive at least one brand preference specified by said consumer.

18. The invention of claim 1 wherein said formulating is performed as a function of bidding rules previously specified by each said bidder.

19. The invention of claim 18 wherein at least one of said bidding rules specified by a bidder is a predetermined default brand to be included in a bid for non-brand-specified items on the item list.

20. The invention of claim 18 wherein at least one of said bidding rules specified by a bidder indicates the willingness of that bidder to accommodate particular fulfillment preferences that might be specified by the consumer.

21. The invention of claim 18 further comprising formulating at least one further bid for the list of items based on prices of the items on said list specified by at least one on-line vendor who has not specified any bidding rules to said bid engine computer system.

22. The invention of claim 1 wherein said formulating is performed as a function of at least one of a) a bidding history of said consumer, and b) a purchasing history of said consumer.

23. The invention of claim 1 wherein said formulating is performed as a joint function of a) fulfillment preferences specified by the consumer, at least one of the fulfillment preferences being other than item price and other than a delivery preference, and b) criteria previously specified by each said bidder, at least one of said criteria being other than item price.

24. The invention of claim 1 wherein said list of items is pre-stored by said bid engine computer system and wherein said bid formulating is undertaken in response to an indication from said consumer that bids are desired for said pre-stored list or for a version thereof modified by said consumer.

25. The invention of claim 1 wherein at least two of said bids are from the same bidder.

26. The method of claim 1 wherein said list includes at least twenty different consumable items.

27. Apparatus comprising
   a database arranged to store product and price information from bidder/sellers, the store product and price information being for goods including at least one of milk, bread, eggs, beef and olives,
   a customer interface arranged to receive a request from a consumer for bids on a list of items specified by the consumer, said list of items including at least one of said milk, bread, eggs, beef and olives, and
   a bid engine computer system arranged to use said product and price information and pre-defined bidding rules that have been placed by the bidder/sellers to formulate at least two bids responsive to said consumer request, each of said at least two bids including terms under which the bidder is willing to sell the list of items to the consumer, each bid having at least one non-price term that is different from any term in each other bid, said at least one non-price term being other than a delivery term,
   said customer interface being further adapted to concurrently present said bids to said consumer and to receive an indication from the consumer as to which of the concurrently presented bids the consumer wishes to accept.

28. The apparatus of claim 27 wherein said bid engine computer system is further arranged to use fulfillment preferences specified by said consumer in formulating at least one of said bids.

29. The apparatus of claim 27 further comprising a database arranged to store at least one sample shopping list and wherein at least a part of said request is the identification of said sample shopping list by said consumer.

30. The apparatus of claim 27 wherein said list of items specified by said consumer includes at least one item identified from a shopping list that includes at least twenty different consumable consumer items, at least a portion of said stored shopping list having been created on a day previous to the day on which said request for bids was received.

31. The apparatus of claim 30 wherein said identification of said shopping list by said consumer is via selection of a sell-side icon.

32. The apparatus of claim 30 further comprising augmenting said list to include a particular item in response to an indication received from said consumer by a means other than an on-line session between the consumer and the apparatus.

33. The apparatus of claim 32 wherein said indication is received from said consumer via a sell-side icon.

34. The apparatus of claim 32 wherein said indication is received from said consumer via a website.

35. The invention of claim 32 wherein said indication is received from said consumer via an interactive TV system.

36. The invention of claim 32 wherein said indication is provided by said consumer by scanning a barcode.

37. The apparatus of claim 30 further comprising a master product database containing information about products that said consumer may wish to place on said list and wherein said customer interface is arranged to allow the consumer to add items from said master product database to said list.

38. The apparatus of claim 30 further comprising a database containing incentives that can be included in said bids and wherein said bid engine computer system is further adapted to include a selected one or more of said incentives in at least one of said bids while not including at least one of the selected incentives in at least one other of said bids.

39. The apparatus of claim 38 wherein said incentives include at least one of: coupons, free goods, cash and loyalty incentives.

40. The apparatus of claim 38 wherein said one or more incentives is individualized to said consumer based on at least one list of items that had been previously specified by said consumer.

41. A method comprising conducting an on-line reverse auction wherein bidder/sellers submit reverse bids for a list of at least twenty different consumable consumer goods specified by a consumer, wherein the reverse bids differ in at least one term other than the price of the goods and other than a delivery term, the on-line reverse auction being conducted by a bid engine computer system that formulates bids on behalf of bidder/sellers based on product information, product prices and bidding rules previously provided to said bid engine computer system by each bidder/seller and that concurrently presents the formulated bids to the consumer.

42. A method for use by a bid engine computer system to conduct a reverse auction for a list of at least twenty different consumable consumer items specified by a consumer, the method comprising
   formulating, by the bid engine computer system, at least two reverse bids for the list of items on behalf of a single bidder/seller, each said bid including a price for the list of items, the reverse bids differing in the price of the items and also differing in at least one term other than the total price of the items, one of the reverse bids specifying a first brand for a particular one of the items and another one of the reverse bids specifying a second brand for said particular one of the items, and
   causing, by the bid engine computer system, each of the reverse bids to be delivered to the consumer.

43. The method of claim 42 wherein said bid engine computer system further formulates said bids based on product information, product prices and bidding rules previously provided to said bid engine computer system by the bidder/seller.

44. The method of claim 43 wherein said bid engine computer system further formulates said bids as a function of fulfillment preferences associated with said list specified by said consumer, at least one of the fulfillment preferences being as to other than price.

45. The method of claim 41 wherein at least certain ones of the twenty consumable goods are refrigerated food items.

46. The invention of claim 41 wherein at least two of said reverse bids are from the same bidder.

* * * * *